United States Patent [19]
Williamson et al.

[11] Patent Number: 5,474,111
[45] Date of Patent: Dec. 12, 1995

[54] FINE PARTICLE HANDLING

[75] Inventors: Richard Williamson, Roswell, Ga.; Richard E. Cavagnaro, Dublin; Dean Leiby, Brecksville, both of Ohio

[73] Assignee: Degussa Corporation, Ridgefield Park, N.J.

[21] Appl. No.: 139,698

[22] Filed: Oct. 22, 1993

[51] Int. Cl.$^6$ ............................. B65G 65/34; B65G 53/24
[52] U.S. Cl. ................................. 141/1; 141/10; 141/114; 141/314; 141/330; 406/137; 406/143; 406/152
[58] Field of Search .................................. 141/1, 7, 8, 10, 141/63, 70, 65–68, 114, 313, 314, 317, 330; 406/137, 141–143, 151–153; 222/81, 82, 87, 89; 206/386

[56] References Cited

U.S. PATENT DOCUMENTS

| | | | |
|---|---|---|---|
| 537,615 | 4/1895 | Novotny | 141/317 X |
| 2,301,617 | 11/1942 | Cox et al. | 406/152 |
| 2,861,604 | 11/1958 | Whitmire | 141/285 |
| 3,118,474 | 1/1964 | Eppolito | 141/68 |
| 3,214,221 | 10/1966 | Finnegan | 406/109 |
| 3,886,983 | 6/1975 | Forssen et al. | 141/68 |
| 3,994,532 | 11/1976 | Hahn | 406/115 |
| 4,018,253 | 4/1977 | Kaufman | 141/65 |
| 4,149,755 | 4/1979 | Handleman et al. | 406/90 |
| 4,182,386 | 1/1980 | Alack | 141/83 |
| 4,205,930 | 6/1980 | Handleman et al. | 406/90 |
| 4,234,273 | 11/1980 | Handleman et al. | 406/90 |
| 4,296,860 | 10/1981 | Hsu et al. | 206/386 |

(List continued on next page.)

FOREIGN PATENT DOCUMENTS 0033832  1/1981  European Pat. Off. .

OTHER PUBLICATIONS

DeGussa Tech. Bulletin Pigments #11, "Basic Characteristics of Aerosil®", Aug. 1993.
DeGussa Tech Bulletin Pigments #28, "The Handling of Synthetic Silicas and Silicates", Aug. 1992.
The Bulk Box Is Here! 2–page product information sheet on Degussa Corp.'s Bulk Box, no date.
The Air Pallet® Ejector–Mixer System product brochure of Semi–Bulk Systems, Inc., 3 pages. 1989.
Shuert Industries, Inc. "Uni–Pak Bulk System" Fact sheet, no date.
EXPANCEL® Product Brochure–with a 6–page internal leaflet and two single page leaflets concerning EXPANCEL® microspheres. The six–page leaflet being dated Apr. 1991.

*Primary Examiner*—J. Casimer Jacyna
*Attorney, Agent, or Firm*—Beveridge, DeGrandi, Weilacher & Young

[57] ABSTRACT

A method and assembly for removing fine particles in an essentially dust-free manner which features a semi-bulk container bag that is removed from a reusable protective container, hoisted off the ground and punctured with a discharge probe. The puncturing of the plastic bag is achieved by inserting a spear shaped probe with tapered nozzle head. The probe is sealed with respect to the bag. The nozzle head includes a plurality of elongated discharge openings, as well as a nozzle tip with a plurality of injection ports. Fine particles having a size of less than 400 μ, are fluidized and then discharged out through the discharge openings by a suction device. Fluidization is achieved by injecting air or inert gas through the tip of the nozzle head. The fluidized fine particles removed from the bag are passed through the discharge openings, out through the probe, through a flexible conduit and to a storage or further processing device. The bag is preferably formed of an anti-static or conductive material to prevent the attachment of fine particles to the interior surface of the bag. Fluidization continues until the very end of particle removal so as to prevent the bag from collapsing and blocking the discharge openings. Sealing is preferably achieved by sliding a locking sleeve into contact with a cup-shaped member which pinches the plastic between the cup-shaped member and the rear end of the nozzle head.

34 Claims, 6 Drawing Sheets

U.S. PATENT DOCUMENTS

| | | | |
|---|---|---|---|
| 4,415,085 | 11/1983 | Clarke et al. | 206/526 |
| 4,431,316 | 2/1984 | Massey | 383/113 |
| 4,445,809 | 5/1984 | Schmitz et al. | 406/152 |
| 4,457,456 | 7/1989 | Derby et al. | 222/105 |
| 4,550,755 | 11/1985 | Vredenburg, Sr. | 141/59 |
| 4,574,851 | 3/1986 | Lepisto | 141/68 |
| 4,833,008 | 5/1989 | Derby . | |
| 4,918,906 | 4/1990 | Ako | 53/449 |
| 4,989,731 | 2/1991 | Shuert | 206/386 |
| 5,018,877 | 5/1991 | Kantz | 141/114 X |
| 5,248,429 | 9/1993 | Larsen | 141/114 X |

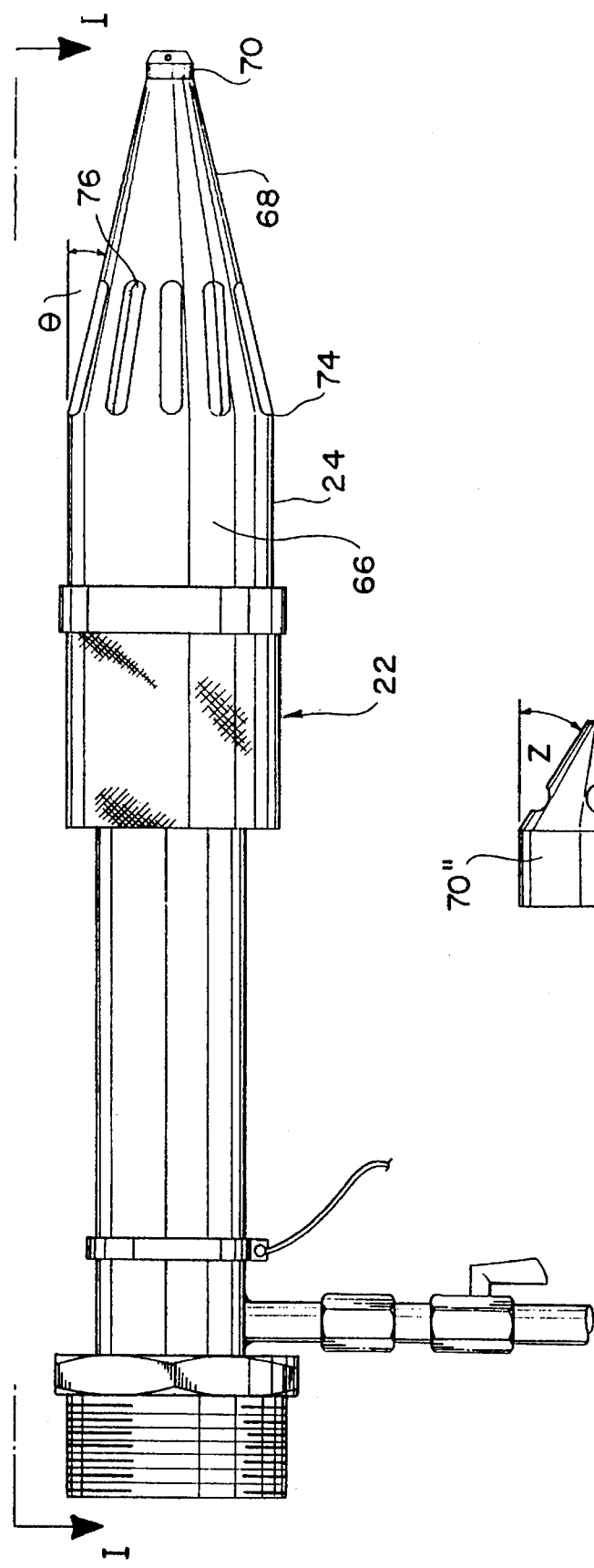
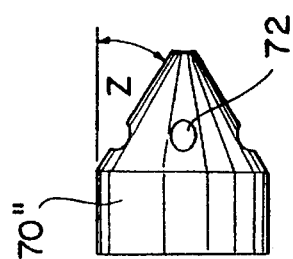

FINE PARTICLE HANDLING

FIELD OF THE INVENTION

The present invention relates to the removal of fine particles (e.g. particles having a particle or grain size of less than 400 μ) from a plastic bag hoisted from a protective reusable container. More particularly, the present invention is directed at the removal of fine particles from a bag through the simultaneous fluidization and suction discharge of the fine particles following insertion of a probe into the bag and the sealing of the probe with respect to the bag.

BACKGROUND OF THE INVENTION

The handling of fine particles with a high surface area and low density has proven to be particularly troublesome in those industries which handle such material. One particular problem in fine particle handling is the providing of a system that is essentially dust-free so as to maintain a safe working environment while also providing a quick, easy and relatively inexpensive handling system. In addition, any time there is a dust problem in the working environment, there is also an increased chance of contamination of other products. The amount of dust which is produced in the working environment is related in some respects with the manner in which the fine particles are received by the intended users. Some recipients of fine particles rely on silos or storage rooms which are capable of handling large volumes of material. With such storage facilities, bulk delivery is typically the most economical and often features road or railborn silo vehicles with pneumatic pumps that can pump the material from the silo vehicle directly to the storage facility. Hence, this system is very effective in maintaining a relatively dust-free working environment. However, not all facilities have the necessary equipment or storage space for receipt of a bulk delivery while other facilities do not use a sufficient volume of the fine particle material to warrant the expense of a bulk delivery receiving system.

For low volume users of fine particles or for recipients which have little storage space, delivery of the fine particles by way of paper sacks stacked on pallets is often preferred. However, the potential for dust creation is high when dealing with individual bags as the opening and disposal of each bag has a tendency to release dust into the environment. While there are automated assemblies for opening, emptying and discarding bags, this equipment is very expensive and thus often not economically plausible for many recipients.

Many customers or recipients prefer semi-bulk delivery as it avoids the high labor requirements associated with handling a plurality of individual paper sacks or because they use an amount of the particle material which falls between the extremes of bulk delivery and paper sack delivery. In an effort to satisfy the requirements of these intermediate users, various semi-bulk containers have been introduced. For example, a container-formed of reinforced lined fabric has been utilized. This flexible container is suspended and typically discharged by the opening of an integral nozzle forming part of the flexible container into an inner port of a further processing or delivering system.

The use of a flexible intermediate bulk container can, however, present some problems with respect to escape of particles during the release of the particles to the downstream processing or delivering system. In addition, before the empty bag can be discarded, it has to be folded to a size which may be easily handled. The folding and handling of the large bag can lead to a large generation of dust in the environment, especially in light of the fact that the particles often stick to the side of the container due to the static charges which develop during emptying. The requirement for disposing of the intermediate bulk containers also creates a large waste disposal problem which is environmentally undesirable.

Attempts to reuse the intermediate or semi-bulk containers present numerous problems such as contamination problems and increased dust creation.

The industry has also utilized folding cardboard boxes as semi-bulk containers and the like, which are disposed in the same manner as the flexible reinforced fabric bulk containers. Some of these disposable cardboard boxes use an intermediate layer of plastic lining and an inner cardboard sleeve. Removal of the particles in these boxes includes the use of a shower head type nozzle which fluidizes and draws the particles out once the box and liner are opened for receipt of the nozzle head. As with the reinforced fabric semi-bulk containers, there is a great deal of undesirable dust creation and waste disposal requirements associated with collapsible cardboard boxes of this type. The industry has also used permanent, refillable containers, but this adds to the cleaning and shipping weight costs and thus has not been used extensively in the industry.

The requirement for a dust-free working environment is mandated in many countries by way of regulations which fix the maximum dust concentration that can exist in the work environment. The maximum dust concentration value is determined, in part, on the perceived health risk associated with a particular fine particle material. These regulations typically set a limit value on the weight of fine particle material per given volume of air or upon the number of particles per given volume of air. For example, although synthetic amorphous silicas have not been found to be harmful to the lungs to date, these substances are included in the list of materials which have been assigned a maximum concentration value at the work place. In the Federal Republic of Germany, for example, the maximum synthetic silica concentration is set at 4 $mg/m^3$. It is thus imperative that the fine particle handling process and any later disposal requirements be of a type which avoids the introduction of dust into the environment.

Many fine particles also produce tremendous electrostatic charges when being conveyed, particularly at very high speeds. Hazards connected with static charges of this nature, e.g. flying sparks have resulted in the introduction of grounding or earthing systems in the piping systems used to transport synthetic silicas from storage rooms or silos. The static charges which develop also cause particles to stick to the interior of the containers which is not only a loss of material, but also creates a higher potential for dust production in the work place during container disposal.

SUMMARY OF THE INVENTION

The present invention is directed at providing a fast and easy handling system which minimizes both dust formation and waste disposal requirements when semi-bulk containers are being emptied of fine particle materials.

The method of the present invention is directed at dust-free handling of fine particles and includes the steps of removing a semi-bulk bag containing fine particles having an average size of less than 400 μ from a reusable shipping container. While the bag is removed and hoisted or suspended above the ground, a probe is inserted into a lower region of the bag. Following insertion the probe is sealed with respect to the bag. Once the probe is sealed with respect to the bag, air or an inert gas is injected through at least one injection opening formed in a nozzle provided at the end of the probe. The injected gas fluidizes the fine particles and, while the fine particles are fluidized, they are discharged from the bag by drawing the fine particles out through at least one discharge opening formed in the nozzle head with a vacuum source.

In a preferred embodiment, the bag is a single layer, relatively thin plastic bag which has anti-static or conductive properties. The nozzle head at the end of the probe preferably includes a tapered front portion, a cylindrical midportion and a rear shoulder region which is connected to a conduit extending away from the nozzle.

The tapered front end of the probe's nozzle head is used to puncture the bag or increase an opening already formed in the bag such that the plastic material bordering the puncture hole slides along the tapered front end, over the cylindrical region and contracts into position behind the rear shoulder of the nozzle head. As the sealing of the nozzle with respect to the plastic bag is important from the standpoint of ensuring that dust is not generated in the working environment, it is important that the sealing mechanism provides a good seal. It is also important that the sealing process is a quick and easy process.

In a preferred embodiment, a cup-shaped ring slides along a rigid probe extension extending away from the rear of the nozzle head. The ring is adapted to extend about the rear end of the cylindrical portion of the nozzle head and preferably has a contour which is similar to a sloping back shoulder of the nozzle or designed to ensure that the plastic bordering the puncture hole is received and pinched between the ring and the nozzle head. A threaded cylindrical sleeve is used to lock the cup-shaped ring into position following placement of the plastic surrounding the puncture aperture into position between the nozzle head and the cup-shaped ring.

To facilitate removal, air or an inert gas is injected through one or more openings provided in the central region of the nozzle. After 5 or 10 seconds of injection, the suction creation means is turned on so as to draw the fine particles through separate openings formed in the tapered portion of the nozzle at the same time the fine particles are being fluidized by the injected gas. The air or inert gas is injected through an injection conduit extending along the central axis of the nozzle head and into communication with a nozzle tip having a plurality of small gas injection ports formed therein. The discharge openings are preferably elongated elliptical openings equally spaced about the circumference of the tapered portion of the nozzle head. This arrangement has been found to be well adapted for the removal of fluidized fine particle material having an average particle size of less than 400 $\mu$, a surface area of 20 $m^2/g$ to 1,000 $m^2/g$ and a tapped density of 20 g/l to 800 g/l. The present invention is thus particularly suited for the removal of chemicals such as silicon dioxides, metallic oxides, carbon blacks, aluminum silicates, calcium silicates, and zeolites from a plastic semi-bulk bag.

In one embodiment of the present invention, the nozzle includes at least one puncturing enhancing member and the insertion of the probe includes puncturing the plastic bag with at least one puncturing enhancing member and further inserting the nozzle into the bag until the plastic contracts about the shoulder at the rear end of the nozzle. Also, with materials of this sort, it is preferable to inject air or other inert gas from the nozzle at a pressure of 10 psi and lower. Also, with the simultaneous fluidization and suction, the pressure inside the bag is preferably placed at about 0.01 bar to 0.5 bar. It is also preferable to maintain the pressure of the vacuum source constant during discharge of the fine particles. The injected pressure can also be constant, but it has been found advantageous to reduce the pressure of the fluidization gas in stepped or gradual fashion. For instance, the initiation of fluidization at 10 psi and a gradual decrease down to 0 psi at the very end of drawing out the fine particles has proven advantageous. It would also be possible to vary both the fluidization pressure and the vacuum pressure or maintain the fluidization pressure constant while varying the vacuum pressure. In any of these embodiments the ultimate goal is to form a vacuum of 0.01 to 0.5 bar in the bag for simultaneous fine particle discharge and fluidization as well as for maintaining the bag at least partially inflated so as to avoid having the bag entirely collapse about the nozzle head.

The present invention includes the step of grounding the probe by passing a conductive wire from a conductive ring secured to the probe to a suitable grounding source. Furthermore, in order to obtain a maximum amount of the particle material from the semi-bulk bag and to avoid having a significant amount of particles stuck to the bag during disposal, it is preferable that the bag be formed of an anti-static or semi-conductive to conductive material. From the standpoint of avoiding static electricity problems, it would be desirable to make the plastic bag completely conductive. However, since an increase in the conductivity of the bag generally results in a decrease in the transparency of the bag, the use of a semi-conductive bag with a see-through quality is desirable. The transparency of the bag is important in the sense that an operator can see the amount of fine particles remaining and make the appropriate adjustments in the fluidization/discharge system. The semi-conductive nature of the bag is useful in dissipating potential electric static charges from the bag through a dissipation of electrical charges from the bag to the metallic probe and then to the grounding wire.

BRIEF DESCRIPTION OF THE PREFERRED EMBODIMENTS

FIG. 1 provides a schematic view of a system suitable for use in the method of the present invention;

FIG. 3 shows a preferred probe for carrying out the method of the present invention;

Figure 5:
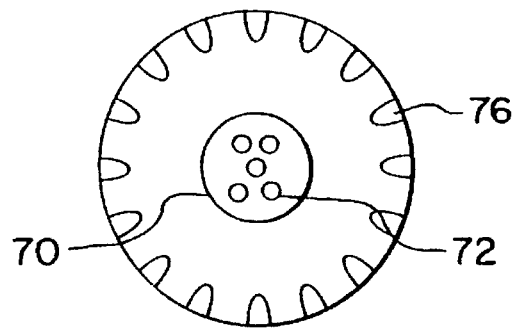
Figure 4:
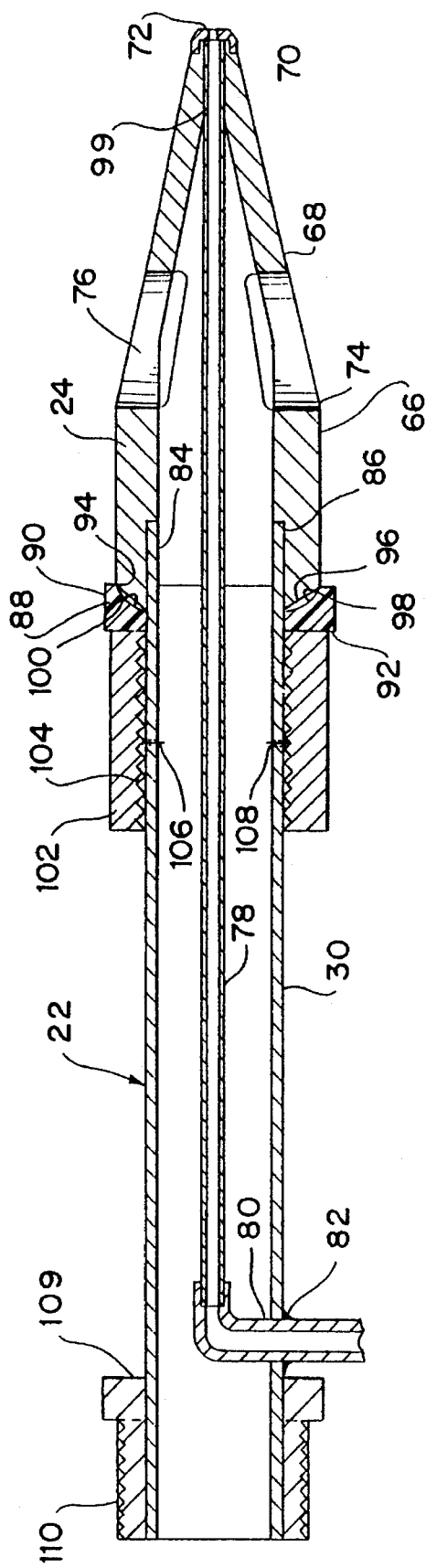
FIG. 4 shows a cross-sectional view taken along cross-section line I—I in FIG. 3.
Figure 6B:
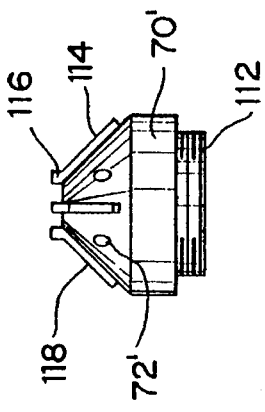
Figure 6A:
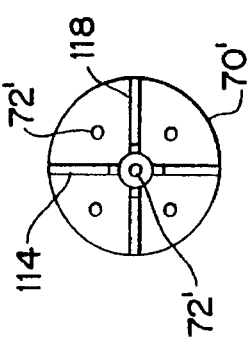
Figure 7:
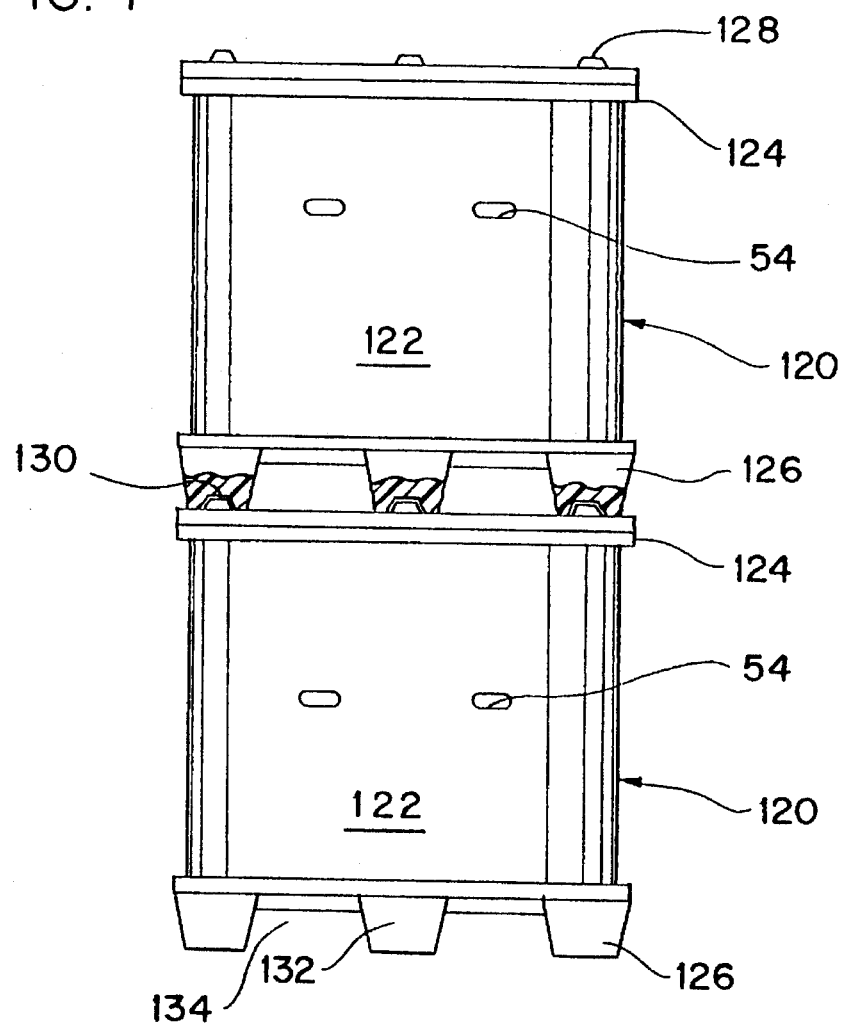
Figure 8:
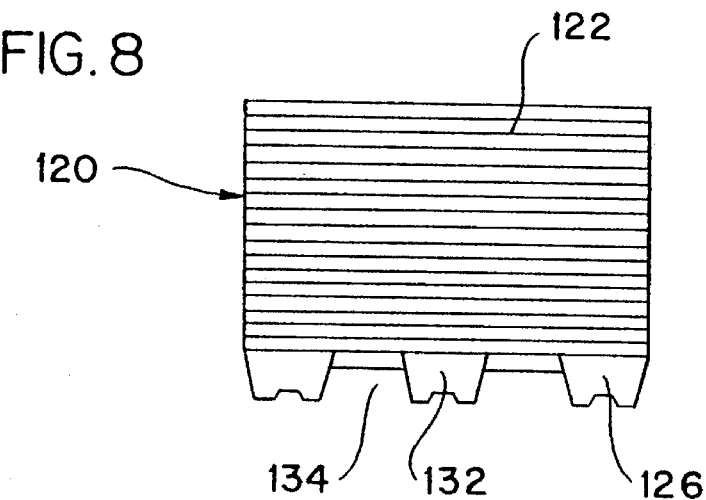
Figure 9:
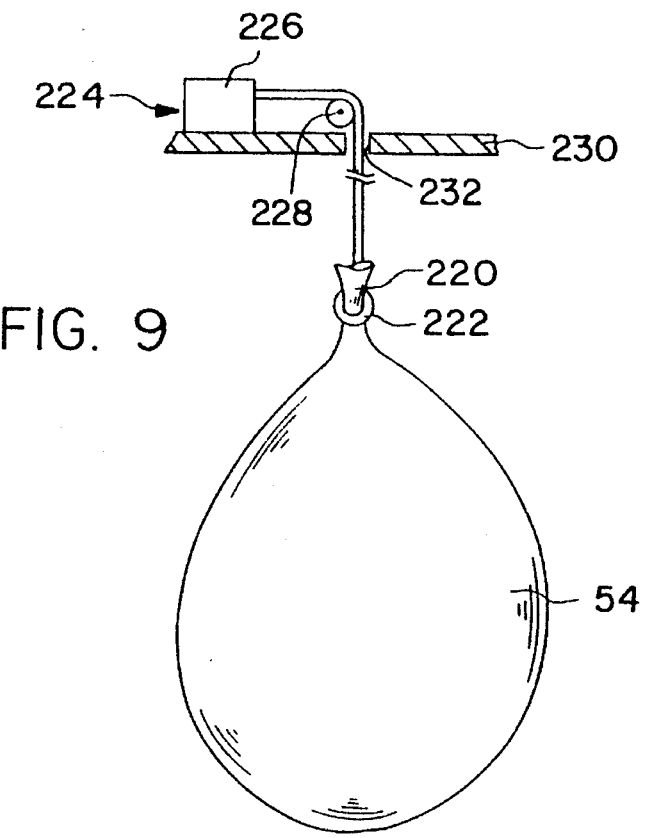
Figure 10:
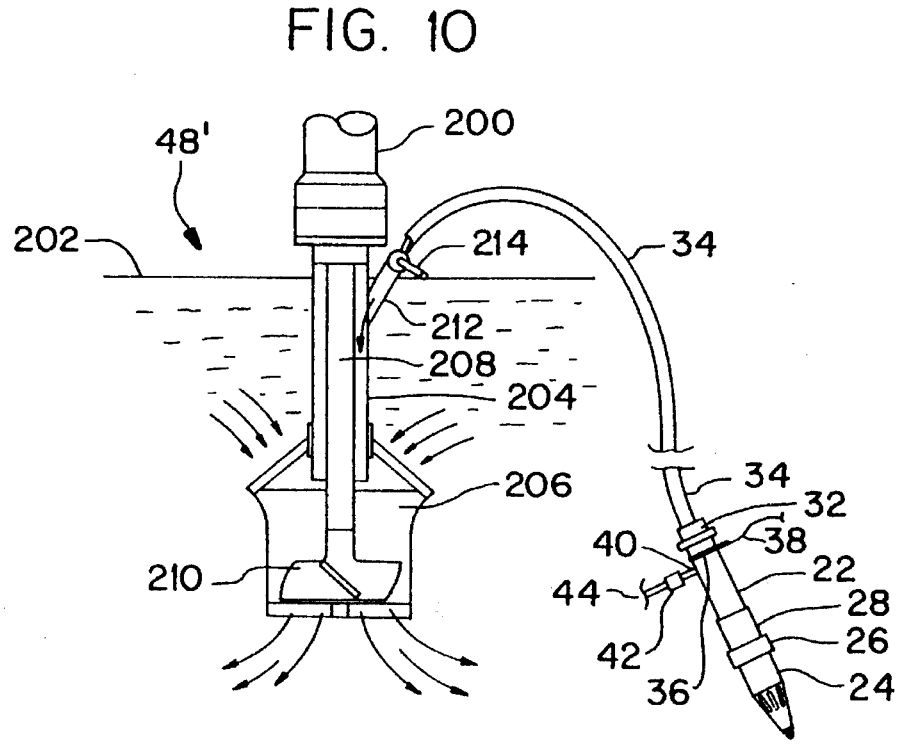

FIG. 5 provides a frontal view of the nozzle head shown in FIG. 4;

FIG. 6A illustrates an alternate embodiment of the nozzle tip for use with the nozzle head shown in FIG. 4;

FIG. 6B illustrates a side view of that which is shown in FIG. 6A;

FIG. 6C illustrates an alternate embodiment of the nozzle tip;

FIG. 7 shows two reusable semi-bulk shipping containers in a stacked arrangement;

FIG. 8 shows one reusable shipping container subsequent to bag removal and in a collapsed storage position; and FIG. 9 shows an alternate hoisting arrangement for use in the present invention; and FIG. 10 shows an alternate suction source for this invention.

DETAILED DESCRIPTION OF THE PREFERRED EMBODIMENTS

Figure 1:
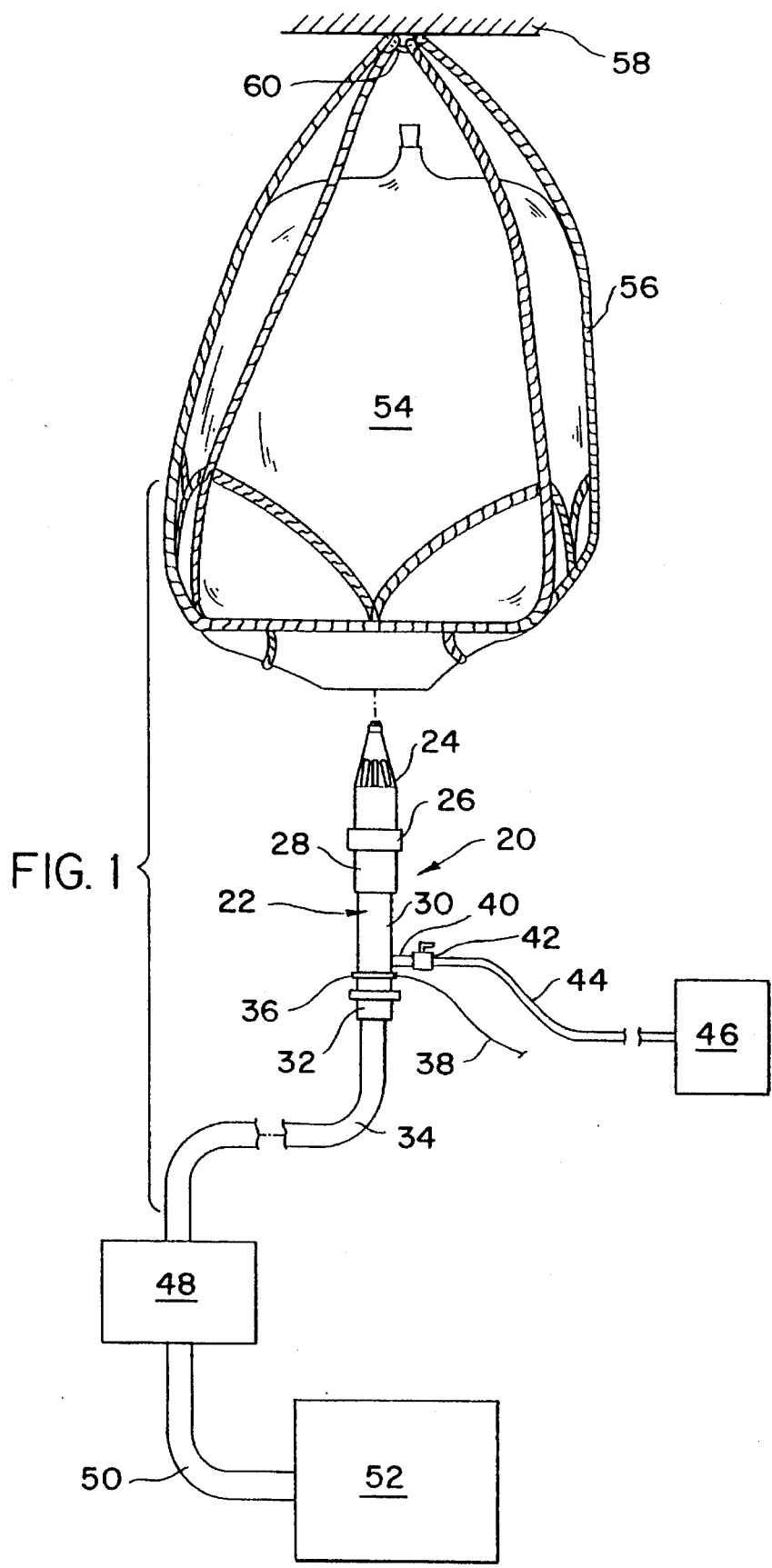

FIG. 1 shows a schematic view of a system suitable for use in the method of the present invention. As shown in FIG. 1, fluidization/discharge system 20 comprises probe 22 with nozzle head 24, sealing ring 26 and locking sleeve 28. Probe 22 also includes rigid conduit extension 30 having a first end attached to nozzle head 24 and a second end coupled at coupling 32 to flexible conduit 34. Sealing ring 26 and locking sleeve 28 are adapted to slide along the exterior surface of conduit extension 30. Probe 22 also includes conductive strap 36 which is attached to conductive wire 38, which is fixed at its opposite end (not shown) to any appropriate grounding source.

Probe 22 also includes extension 40 with stop valve 42. Flexible gas line 44 is attached at one end to stop valve 42 and at an opposite end to a pump or other pressurized gas source 46. The gas which is pumped through line 44 is preferably either air obtained from the immediate environment or from an outside environment or inert gas obtained from a storage tank. If pump 46 draws air from the immediate environment, a reduction of dust in the environment takes place, especially when filtering screens are provided at the intake. Drawing air from the immediate environment raises the possibility in some situations of contaminants being introduced in with the discharged material during fluidization. If contamination is a big concern, then either the aforementioned filtering system, air from a cleaner outside source, or inert gas can be used.

Injection pump 46 can be any suitable pump such as an air diaphragm pump which places the air being injected through the nozzle head at a value of 0 to 10 psi. These pressure values for pump 46 work particularly well with a flexible gas line having an internal diameter of about ¼ to ¾ inch, (essentially equal to the internal diameter of extension 40). Vacuum pump 48, in a preferred embodiment, is driven between 2.0 to 8.0 bar, more preferably, 4.0 to 7.0 bar and even more preferably 5.0 to 6.0 bar. These values for the vacuum pump are designed to create a vacuum for product discharge within the bag of 0.01 to 0.05 bar while fluidization is taking place. An air diaphragm pump is also suitable for creating the required vacuum source.

Flexible conduit 34 is connected to vacuum source 48 which in a preferred embodiment is a negative pressure vacuum pump such as a Vac-U-Max vacuum pump of the Vac-U-Max Company in Belleville, N.J. which is rated at 2–8 bar and is well adapted to provide the 0.01 to 0.5 bar vacuum pressure in the bag during fluidization.

Conduit 34 preferably has a diameter of 1 to 3 inches with a length before the vacuum source of 2 to 30 meters and a length from the suction source to the storage or process location of up to 80 m. Conduit 34 is preferably formed of a soft, highly flexible PVC material on its exterior. Conduit 34 is also formed of a harder PVC material arranged in a spiral pattern within the external softer layer. A copper wire runs internally of the exterior layer so as to help dissipate static charges produced by the high velocity particles travelling in conduit 34. The internal diameter of hose 34 is preferably about the same as that of extension 30.

The suction means is preferably placed in line with a downstream processing system or storage system 52 (e.g. a mixing system). Alternatively, in some situations, it is possible to rely on the suction power of the downstream processing system itself. For example, a Jet Stream Mixer such as that produced by Ystral GmbH. D-7801 Ballrechten-Dottingen or the AIR PALLET® Ejector Mixer System manufactured by Semi-Bulk Systems, St. Louis, Mo. are possible sources.

The AIR PALLET system is designed to convey fluidized powders to a mixing system by the vacuum generated when pressurized fluid is forced through its annular nozzle and mixed with the particles and ejected to a slurry tank or other receiving means. The Air Pallet System can be used in association with the fluidizing/discharging system and semi-bulk container assembly of the present invention to provide a complete delivery system.

An example of a Ystral type mixer is illustrated in FIG. 10 together with probe 22 attached to flexible conduit 34. As shown in FIG. 10, probe 22 with attachments is connected to hose 34 which, in turn, is connected to the vacuum source 48' which in this case is a jet stream mixer. As shown in FIG. 10, jet stream mixer 48' includes main body 200 having a free end received within liquid 202. Main body 200 includes stator pipe 204, mixer fitting 206, shaft 208, blade 210, suction inlet 212 and shut-off flap 214. When the ejector mixer is operating, it creates a vacuum which draws particles out of the bag. In the present invention, the ejector mixer is run at a rate which creates a vacuum of 0.01 to 0.5 bar in the bag.

In the alternate embodiment shown in FIG. 1, hose 50 extends from vacuum source 48 to the storage or process means 52. The storage or process means 52 typically includes such things as a mixing vessel or a staging silo which facilitates a continuous controlled dosing of the fine particle material without fluid absorption in the batch being produced. A metering system can be, for example, relied upon to avoid agglomeration problems in the batch. The batch can be, for example, an unsaturated polyester mixed with a fumed silica fine particle material which mixture is often used for manufacturing such things as boat hulls, shower stalls, etc.

Figure 2:
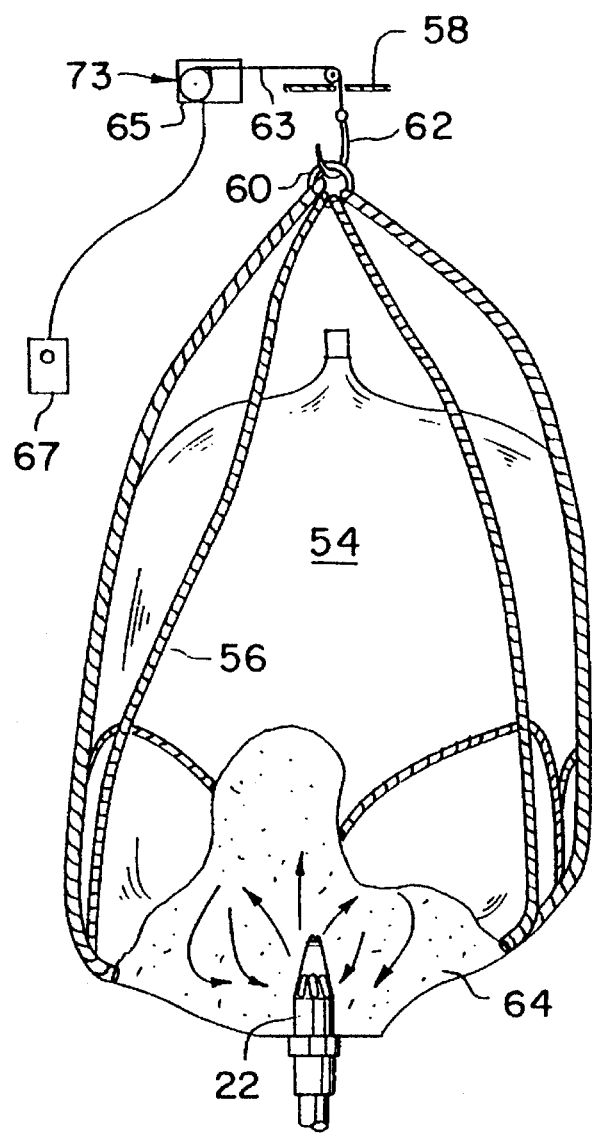
FIG. 2 shows a cutaway view of the bag shown in FIG. 1 with the nozzle fixed in position and operating to fluidize and remove the fine particles contained in the bag.

FIG. 1 also illustrates a suspended semi-bulk container bag 54 supported by harness assembly 56, which in turn, is supported by a suitable overhead support structure 58. Harness 56 can be formed of any material known in the art and is preferably formed of nylon straps of material with looped ends with or without ring 60. Either ring 60 or the looped ends of the straps can be attached to holder 62 affixed to support structure 58 (see FIG. 2). Alternatively, harness 56 can be made as an integral component of the semi-bulk container bag 54 instead of being placed around bag 54 after bag 54 is removed from a protective semi-bulk shipping container, such as that shown in FIG. 7. Harness 56 can also be a separate element which is positioned in the shipping container prior to insertion of the semi-bulk bag 54. In this way, all that needs to be done is either a manual hoisting of the bag onto holder 62 or, more preferably, as the bag weight can vary from 10 to 1,000 pounds, the lowering of hook 62 with hoisting system 73. FIG. 2 shows a suitable hoisting system which includes hook 62, cable 63, winch 65 and hand actuated on/off switch 67. This hoisting arrangement is particularly well suited for semi-bulk bags having a weight greater than 100 pounds.

FIG. 9 shows an alternate embodiment wherein bag 54 has neck 220 about which looped cord 222 is secured. Cord 222 is attached to a hoisting assembly 224 which includes winch 226, guiding roller 228 and support structure 230 with aperture 232. Various other methods and structures are contemplated for use in the present invention including the use of a fork truck to hoist the bag up while leaving an open central bottom region for probe injection.

Preferably semi-bulk bag 54 is a large polymer resin plastic bag. A suitable material for the bag would be any member of the polyolefin family. A bag such as a low density polyethylene bag having a thickness of about 2.5 to 5.0 mm is preferred. This thickness range is generally applicable to the other types of plastic bags in the polyolefin family noted above. The thickness of the bag is varied in accordance with the weight of the product to be removed from the container which, for the purposes of the present invention, ranges from 10 to 1,000 pounds. With a possible bag weight range of 10 to 1,000 lbs, even the 5 mm bag thickness would have problems handling the upper end of the weight range. For bags in, for example, the upper half of the weight range, harness 56, a suitable cargo net or even the flexible fabric bags or sacks with integral nozzle described previously can be used to encompass and support the hoisted plastic bag. Unlike the prior art, the plastic interior liner together with the fluidizing/discharge system would avoid dust problems. Also, the bag of the present invention preferably is a four point bottom bag rather than a single seam bag with the seam being in the middle of the bottom as is common with a typical garbage bag. The four point bottom arrangement which is a familiar arrangement in the bag industry provides increased strength and avoids seam blow out which can occur with a single seam bag when a heavy weight bag is hoisted.

The bag is sealed after filing so as to be airtight and placed in a reusable container such as that shown in FIG. 7 for shipping to the customer. Sealing is achieved by either tying off neck 220 or sealing off the entire opening with adhesive or heat bonding.

In order to limit static charge, bag 54 is preferably an anti-static or semi-conductive to conductive bag. To provide an anti-static bag, plastic bag 54 can be formed with an interior conductive layer. A suitable conductive layer is one where the inner layer is formed by electron depositing a layer of aluminum or other electrically conductive metal on the inside surface of the bag 54. Alternatively, and more preferably, from the standpoint of avoiding flaking and a contaminated product, a conductive or semi-conductive powdered material can be mixed with the polymeric resin prior to bag formation. For example, a dispersed amount of conductive aluminum oxide (such as Aluminum Oxide "C" of Degussa AG of Germany) or conductive carbon black material such as PRINTEX® L6 of Degussa AG) can be mixed with powdered polymeric resin prior to the melting of the powdered resin and the formation of the bag. To achieve the desired conductive properties while maintaining at least some degree of the desired transparency, a range of 25 to 35% by weight of conductive carbon black in the powdered plastic bag mix is suitable. The higher end of the range is highly conductive but has less transparency than the 25% which provides some anti-static properties and is more transparent. A corresponding range of 2 to 10% by weight for the aluminum oxide is preferable when such material is utilized.

FIG. 2 shows suspended bag 54 subsequent to the insertion and fixture of probe 24 with respect to bag 54. FIG. 2 also shows the fine particle chemicals in a fluidized state. The present invention is designed to remove fine particle chemicals having a particle size of less than 400 μ in a manner which is essentially dust-free. The invention is particularly suited for handling fine particle material having a tapped density ranging from 20 g/l to 800 g/l or more preferably a tapped density range from 20 g/l to 600 g/l. The present invention is especially suited for removing fine particles having a tapped density ranging from 20 g/l to 400 g/l as such material is more likely to contain fine dust which is defined as dust able to enter the alveolus (air cells in the lung where the gaseous exchange between the respiratory air and the lung tissue takes place). The aforementioned tapped density is the ratio of mass-to-volume of a substance following tapping under set conditions. Tapped density of the material is determined by DIN ISO 787/XI or JIS K 5018/18.

The surface area and particle size are two other important characteristics as they relate to the type of dust problems which can arise. The surface area of carbon black and fumed silica products has a tendency to increase as the average diameter of the primary particles decreases. Thus, a high surface area value for materials such as carbon black and fumed silica is directly related to the potential for the material to present fine dust problems and other problems associated with small sized particles. The present invention is ideally suited for the dust-free handling of particles having a surface area range (based on BET determined values) of 20 $m^2$/g to 1,000 $m^2$/g, or more preferably 20 $m^2$/g to 700 $m^2$/g.

Also, the present invention is particularly suited for the dust-free handling of particles of a size less than 400 μ. Due to the increased potential dust problems, the present invention is even more particularly useful for particles having a particle size of less than 200 μ and even more suited for use with particles having a size less than 150 μ. The particle size can be determined by various methods such as TEM photographs which are highly accurate.

Fine particle products for which the present invention is best suited includes chemicals or materials such as silicon dioxide, metallic oxides, carbon blacks, aluminum silicates, calcium silicates and zeolite. The present invention has been specifically adapted for use with synthetic fumed or precipitated silicon dioxide, such as the AEROSIL® synthetic silica sold by Degussa AG of the Federal Republic of Germany and Degussa Corp. in the United States. The AEROSIL product is identified as a loose, bluish white powder which contains about 98% by volume of air. The specific gravity of a typical AEROSIL product is 2.2 g/$cm^3$. (The tapped density of AEROSIL "normal" product is about 50 g/l or for compressed AEROSIL product "V" about 120 g/l). As the primary particles of the AEROSIL product are extremely small, a portion of the AEROSIL material is likely to fall within the above-defined fine dust range.

As can be seen from FIGS. 1 and 2, the system of the present invention is readily adaptable for use at any location within a facility having sufficient ceiling height or support structure height to suspend bag 54 so that the probe can be fixed in the lower region of bag 54. If sufficient hoisting height is not available, the fluidization/discharge system can be operated with respect to a bag supported on the floor or a table (e.g. punctured in the side or top). This is not as advantageous as the hoisted arrangement which takes advantage of gravity during discharge of the particles.

FIGS. 3, 4 and 5 illustrates one preferred embodiment of probe 22 for use in the present invention. As shown in FIGS. 3–5, probe 22 includes nozzle head 24 which features a cylindrical portion 66 which is integral with tapered section 68. Tapered section 68 includes a threaded end for receipt of nozzle tip 70. As best shown in FIG. 5, nozzle tip 70 includes a plurality of injection ports 72, one of which is located along the central axis of nozzle 24 and another four arranged on the tapering side surface of the nozzle tip. Extending from the boundary 74 between cylindrical section 66 and tapered section 68 are elongated discharge openings 76. In a preferred embodiment there are 10 elongated openings 76 circumferentially arranged around the tapered section and equally spaced from one another. Each elongated conduit is preferably 3.5 cm in length and 5 mm in width with the circumference of the nozzle at boundary 74 being about 6 cm and the circumference of the nozzle at the forward most end of the elongated opening 76 being about 3.5 cm. The tapered section 68 preferably slopes in convergent fashion at an angle Θ of 10° to 30°. The nozzle tip slopes at an angle of Z (see FIG. 6C) which is preferably about 30° to 60° and more preferably about 45° to 60°. The injection openings 72 in the nozzle tip 70 are preferably circular and about 3 mm in diameter. Rearward of nozzle tip 70 is an internal hollow 77 which snugly receives the forward end of fluidization gas line 78.

The longitudinal length of tapered section 68 is preferably about 9 cm. The longitudinal length of cylindrical section 66 is preferably about 1 cm, the longitudinal length of tip 70 is about 1 cm and the sloping rear shoulder extends longitudinally for about 0.5 cm. The overall longitudinal length of probe 22 is about 36 cm. The nozzle head, non-flexible extension connectors and locking sleeve are all formed of a relatively light weight material such as aluminum or plastic. This light weight material not only makes handling easier but also puts less strain on the plastic in the region of the seal. This is so because, in operation, the operator typically walks away from the bag to another location such that the probe is supported only by its sealing connection with the bag. Plastic can be lighter than the aluminum, but plastic but does not provide for electrical charge dissipation to a grounding source connected to the probe.

The opposite end of fluidization gas line 78 is connected to spigot 80 which is welded at 82 to the exterior of rigid extension conduit 30. Extension conduit 30 is shown in FIG. 4 to be cylindrical with a first end 84 threadably or adhesively connected to the cylindrical portion 66 of nozzle head 24. Cylindrical portion 66 has a recessed area 86 which receives extension end 84 so that a smooth conduit surface is provide from the rear end of probe 22 to discharge openings 76. The diameter of the smooth interior conduit surface of extension 30 is about 1 to 3 inches. Preferably, the smooth interior surface of nozzle head 24 rearward of the tapered section is the same diameter as extension 30 which is also the interior diameter of hose 34.

FIG. 4 also illustrates sliding sealing ring 88. Sliding ring 88 is cup-shaped and includes annular side 90 and base 92. Annular side 90 includes an interior surface which abuts against the exterior surface of cylindrical section 66 (as depicted by reference point 94 in FIG. 4). In addition, cylindrical portion 66 includes rear shoulder 96 which slopes or tapers downwardly from the circumferential border on which point 94 lies down to the rearward most end of nozzle head 24. Cup-shaped ring 88 includes recess 98 which is designed to receive the portion of the bag extending about the punctured hole and compress that portion against rear wall 96 and/or the exterior of cylindrical portion 66. Thus when ring 88 is slid and locked in a forward position a completely sealed arrangement is provided. The annular side 90 of ring 88 also pinches the plastic portion bordering the puncture hole against the exterior surface of portion 66 of nozzle head 24 so as to further ensure a tight seal that will not allow even the smallest particles to escape. Ring 88 includes interior sliding surface 100 which contacts but easily slides along the exterior surface of extension 30. Cup-shaped ring 88 is preferably formed of a relatively hard plastic material such as acetal plastic (e.g., Dupont's DEL-RIN® plastic).

Locking sleeve 102 is positioned rearwardly of sliding ring 88 and has an internal threaded or spiral groove 104. Spiral groove 104 forms a trackway for pins 106 and 108 which are threadably secured to extension 30 and longitudinally spaced a small distance from one another to fit in different sections of the threaded groove 104. The heads of the pins are adapted to slide along the threaded groove 104 formed in locking sleeve 102 and fix and maintain in position ring 88 against the compressed plastic. The exterior surface of locking sleeve 102 is preferably knurled so as to allow for easy gripping and rotation of the locking sleeve in either direction of rotation.

Thus in sealing the plastic bag with respect to the probe 22, nozzle tip 70 is first inserted through the plastic bag 54. This insertion is contemplated in the present invention to occur at a marked region of the bag which is typically at the lowest most central point of the bag which takes advantage of gravity and the shape of the bag in the removal of particles. The marked section of the bag can be weakened (e.g. a partially perforated circle with or without a removable protective adhesive patch). In some situations, such as where the bag is relatively thin (2.5 mm in thickness), a new puncture can be formed by nozzle tip 70 alone, or in other situations, such as where the plastic bag is made thicker to handle a heavier load (5 mm in thickness), a separate incision is made so as to facilitate the initial insertion of the tapered nozzle head. It has proven to be highly advantageous to initiate a hole in the bag with a convergent tip similar to that on a pen or pencil if a separate tool is relied upon. The use of a slicing mechanism such as a knife has a tendency to increase the chance of a rip propagating from the ends of the slice. The conical puncture, however, avoids this rip propagation problem. In one embodiment of the invention, nozzle tip 70 is formed at an angle Z which is relatively steep (e.g., 45° to 60°) so as to provide a convergent tip that more readily punctures even the thicker plastic bags without the need for large pushing forces and without the need for a separate tool.

Once the plastic bag is initially punctured, the nozzle head is inserted completely into the bag with locking sleeve 102 having previously been rotated into a non-locking position and the sliding ring 88 shifted back into its rearward most position. Once the nozzle head is completely inserted into bag 54, the operator can pull back on the probe until the contracted plastic comes into contact with rear shoulder 96. As the initial puncture or incision is of a length which is less than the diameter of shoulder portion 66, the insertion of the nozzle head causes the plastic to expand and slide along the smooth exterior surface of nozzle head 34 until reaching its rear end wherein the plastic material surrounding the puncture hole contracts into its final state. Since the plastic is at all times in contact with the plastic defining the expanding puncture hole, a sealing function is provided for avoiding particle escape during the initial insertion and prior to the fixing of ring 88 into its sealing position. After puncturing and pulling back, ring 88 is then slid into a sealing position wherein the contracted plastic is pinched against the exterior surface of cylindrical portion 66 and the rear shoulder 96. Locking sleeve 102 is then threaded into contact with the ring 88 so that the plastic is compressed and the sealing ring 88 is fixed in position.

Probe 22 further includes coupling 109 which is adhered or threaded to the rear end of extension conduit 30. Coupling 109 includes threaded portion 110 which is adapted to engage with a female coupling member provided at the end of discharge conduit 34.

FIGS. 6A and 6B show a front view and side elevational view of an alternative embodiment of nozzle tip 70 which has been designated 70' in FIGS. 6A and 6B. Nozzle tip 70' includes similar injection openings 72 as shown in FIG. 5. The threaded end 112 of nozzle tip 75 is also shown in FIG. 6B and would be received in a threaded recess formed at the end of tapered section 68 of nozzle 24. Nozzle tip 75 also includes puncture enhancing members 114 each which include post 116 and inclined sections 118. Puncture enhancing members 114 facilitate puncturing of the plastic bag as the vertical posts easily initiate the puncture. The puncture is then expanded upon further insertion of the smoothly tapering nozzle head and the riding up of the plastic material on the inclined section 114. Other types of enhancement members are also possible such as tipped flanges, sharp blade sections, etc. However, it is preferable from a safety standpoint that the puncture enhancing members not be so sharp as to create concern for the safety of the workers.

As noted above, for many uses, the tapering of the nozzle tip to 45° to 60° creates a sufficiently conical tip for achieving puncturing.

FIGS. 7 and 8 illustrate a semi-bulk container 120 with bag 54 placed therein during shipping container 120 protects the bag against puncture and also provides for a fixed form that can be stacked. A suitable reusable container is sold by Shuert Industries, Inc. of Sterling Heights, Mich. The reusable container can also take the form of a plastic crate having a structural framework similar to the design of a typical milk crate. Reusable containers 120 are shown in FIG. 7 to include sleeve portion 122 which is preferably formed of plastic/fiberboard composition such as a wet strength kraft liner board with PBC film exterior. The sleeve is attached at its top to cap 124 which is preferably formed of a molded high density polyethylene resin and includes suitable locking devices [not shown] for attachment of the top 124 to sleeve 122. Pallet base 126 is lockingly fixed to sleeve 122 at the bottom of container 120. Top 124 is preferably provided with positioning knobs 128 which are received within corresponding recesses 130 formed in protrusions 132 of pallet extensions 126. Pallet base 126 is preferably formed as a molded polyethylene resin base with steel reinforcements and includes fork lift entry passageways 134.

FIG. 8 shows container 120 after removal of bag 54 with its fine particle contents. To reduce the storage size, sleeve 122 can be pleated and compressed after removal of the sleeve's contents.

Although the preferred embodiments of the present invention have been described in reference to the accompanying drawings, many modifications and changes may be affected by those skilled in the art without departing from the scope and spirit of the invention as appended hereinafter.

What is claimed:

1. A method of dust-free handling of fine particle material, comprising:

removing a bag containing fine particle material having an average particle size of less than 400µ from a reusable container that is dimensioned to receive only one of said bag when said bag is in a filled state, and while removing said bag, said container is maintained free from contact with said fine particle material;

while said bag is removed from said container, inserting a probe into a lower region of said bag;

sealing the probe with respect to said bag;

fluidizing the fine particles within the bag by injecting a gas through at least one injection opening in said probe;

discharging the fluidized fine particles by drawing the fine particles through at least one discharge opening formed in said probe, and wherein said bag is at least partially transparent and is an anti-static or conducting bag, and said probe being electrically conductive and in electrical communication with said anti-static or conducting bag so as to facilitate electrical dissipation to a ground.

2. A method as recited in claim 1, wherein discharging the fine particles includes discharging particles having a tapped density of 20 g/l to 800 g/l, and a surface area of 20 $m^2$/g to 1,000 $m^2$/g, and a characteristic of said particles being that the surface area of said fine particles increases as an average size of the particles decreases.

3. A method as recited in claim 1, wherein the discharging of fine particles includes discharging particles having a tapped density of 20 g/l to 600 g/l, a surface area of 20 $m^2$/g to 700 $m^2$/g and an average particle size of less than 200µ, and said reusable container having a rigid plastic base, siding and a top which together encompass said bag during a storage state prior to removing the bag.

4. A method as recited in claim 1 wherein the discharging of fine particles includes discharging synthetic fumed or precipitated silicon dioxide particles having a tapped density of 50 g/l to 120 g/l, a surface area of 20 $m^2$/g to 700 $m^2$/g and an average particle size of less than 150µ, and said particles containing about 98% by volume of air.

5. A method as recited in claim 1 wherein said probe includes a nozzle head with a rearward shoulder portion and a tapered front end, and said sealing of the probe with respect to said bag includes puncturing a hole or enlarging a hole by inserting the tapered front end of said probe through said plastic until the plastic is positioned between a shoulder portion and a sliding sealing ring, and threading a locking sleeve so as to compress a hole bordering region of said plastic bag between said sliding ring and said rear shoulder.

6. A method as recited in claim 5 wherein said sliding ring is cup-shaped with a tapered recess which receives the hole bordering region of the plastic bag such that said bordering region is tightly clamped between said sliding ring and rear shoulder.

7. A method as recited in claim 1 wherein fluidizing the fine particles includes pressurizing air to a value of from 0 to 10 psi and discharging the fine particles includes creating a vacuum pressure of 0.01 to 0.5 inside the bag.

8. A method as recited in claim 7 wherein fluidization occurs prior to and during the discharging of the fine particles.

9. A method as recited in claim 1 wherein a plurality of injection ports are provided at a central tip region of said nozzle and a plurality of discharge openings extend longitudinally and are spaced circumferentially about a tapered region of said nozzle and wherein fluidizing the fine particles includes pressurizing gas to about 10 psi or less such that the pressurized gas exits said injection ports and discharging includes creating a vacuum pressure of 0.01 to 0.05 bar within the bag so as to draw fluidized fine particles through said discharge openings.

10. A method as recited in claim 1 wherein said fine particles are synthetic silica particles.

11. A method as recited in claim 1 wherein said particles are fumed or precipitated silicon dioxide.

12. A method as recited in claim 1 wherein said fine particles are chemicals taken from the group comprising:

a) silicon dioxide, b) metallic oxides, c) carbon blacks, d) aluminum silicas, e) calcium silicates, and f) zeolites.

13. A method as recited in claim 1 wherein said bag is a plastic bag having a thickness of 2.5 to 5 mm.

14. A method as recited in claim 1 further comprising grounding said probe during discharge of said fine particles.

15. A method as recited in claim 1 wherein the injected gas is reduced in pressure from 10 to about 0 psi during discharging of said fine particles.

16. A method as recited in claim 1 wherein said bag weighs 100 pounds or more.

17. A method as recited in claim 1 wherein inserting a probe includes pushing a nozzle tip having at least one puncturing enhancing member against said plastic bag and inserting said probe includes puncturing the plastic bag with at least one puncturing enhancing member and further inserting said nozzle into said bag.

18. A method as recited in claim 1 wherein said bag is a single-ply bag and is formed of a plastic material which includes a percentage by weight of carbon black or aluminum oxide.

19. A method of dust-free handling of fine particles, comprising:

inserting a probe into an anti-static or conducting bag containing fine particles having an average particle size of less than 400µ, and said probe being electrically conductive;

sealing the probe with respect to the bag while maintaining said electrically conductive probe in electrical communication with said anti-static or conducting bag;

fluidizing the fine particles within the bag by injecting a gas through at least one injection opening in said probe;

discharging the fluidized fine particles by drawing the fine particles through at least one discharge opening formed in said probe, and said method further comprising grounding said probe during the discharging of the fluidized fine particles such that electricity developed during discharging flows from said bag to said probe and then to the ground, and wherein sealing the electrically conductive probe with respect to the conductive bag includes sealing the probe with respect to a single-ply bag which is at least partially transparent and is formed of a plastic material which includes a percentage by weight of carbon black or aluminum oxide.

20. A method as recited in claim 19 wherein discharging said fine particles includes discharging particles having a tapped density of 20 g/l to 600 g/l, a surface area of 20/g to 700 m²/g, and an average particles size of less than 200µ, and said container being dimensioned for storage of only one of said bag which, when in a filled state, has a weight of 100 pounds or more, and said reusable container having a rigid plastic base and a top, and said container being dimensioned so as to encompass said bag.

21. A method as recited in claim 20 wherein the fine particles are chemicals taken from the group, comprising:

a) silicon dioxide, b) metallic oxides, c) carbon blacks, d) aluminum silicates, e) calcium silicates, and f) zeolites.

22. A method as recited in claim 19 wherein the fine particles have an average size of less than 150µ, and a characteristic of said particles being that the surface area of said particles increases as the average size of the particles decreases.

23. A method as recited in claim 19 wherein said probe includes a nozzle head with a rear shoulder portion and said probe further including a cup-shaped sliding ring with a tapered recess which slides over and about a tapered rear end of said nozzle head.

24. A method of dust-free handling of fine particles of synthetic fumed or precipitated silicon dioxide which includes a quantity of fine dust, comprising:

removing a plastic bag filled with a quantity of said fine particle from a reusable protection container sized to receive only one of said bag when filled with the quantity of said fine particles, said fine particles having a particle size of less than 150µ, a surface area of 20 m²/g to 700 m²/g, a specific gravity of about 2.2 g/cm³ and a tapped density of 50 g/l to 120 g/l;

puncturing the plastic bag and inserting a probe into said plastic bag;

sealing said plastic bag with respect to said probe;

fluidizing said fine particles by injecting and simultaneously removing said fine particles through said probe with a suction device, and wherein said bag is at least partially transparent and is an anti-static or conducting bag, and said probe being electrically conductive and in electrical communication with said anti-static or conducting bag so as to facilitate electrical dissipation to a ground.

25. A method of dust-free handling as recited in claim 24 wherein said plastic bag being removed has a weight of 100 pounds or more and said fine particles are free from contact with said reusable container.

26. A method as recited in claim 24 wherein sealing includes sliding a cup-shaped ring with tapered interior surface over a tapered rear end of a nozzle positioned at the end of said probe and securing plastic material of said bag which surrounds the puncture hole by locking said cup-shaped ring in position over said nozzle and plastic material positioned therebetween.

27. A method of dust-free handling of fine particle material, comprising:

removing a bag containing fine particle material having an average particle size of less than 400µ from a reusable container;

while said bag is removed from said container, inserting a probe into a lower region of said bag;

sealing the probe with respect to the bag;

fluidizing the fine particles within the bag by injecting a gas through at least one injection opening in said probe;

discharging the fluidized fine particles by drawing the fine particles through at least one discharge opening formed in said probe, and wherein said probe includes a nozzle head with a rearward shoulder portion and a tapered front end, and said sealing of the probe with respect to said bag includes puncturing a hole or enlarging a preexisting hole by inserting the tapered front end of said probe through said plastic until the plastic is positioned between a shoulder portion and a sliding sealing ring, and threading a locking sleeve so as to compress a hole bordering region of said plastic bag between said sliding ring and said rear shoulder, and said sliding ring is cup-shaped with a tapered recess which receives the hole bordering region of the plastic bag such that said bordering region is tightly clamped between said sliding ring and rear shoulder.

28. A method of dust-free handling of a quantity of fine particles which includes fine dust particles, comprising:

while said bag is removed from said container, inserting a probe into a lower region of said bag;

sealing the probe with respect to the bag, fluidizing the fine particles within the bag by injecting a gas through at least one injection opening in said probe;

discharging the fluidized fine particles by drawing the fine particles through at least one discharge opening formed in said probe, and wherein said probe includes a nozzle head with a rearward shoulder portion and a tapered front end, and said sealing of the probe with respect to said bag includes puncturing a hole or enlarging a preexisting hole by inserting the tapered front end of said probe through said plastic until the plastic is positioned between a shoulder portion and a sliding sealing ring, and threading a locking sleeve so as to compress a hole bordering region of said plastic bag between said sliding ring and said rear shoulder, and said sliding ring is cup-shaped with a tapered recess which receives the hole bordering region of the plastic bag such that said bordering region is tightly clamped between said sliding ring and rear shoulder, and wherein said bag is at least partially transparent and is an anti-static or conducting bag, and said probe being electrically conductive and in electrical communication with said anti-static or conducting bag so as to facilitate electrical dissipation to a ground.

29. A method as recited in claim 28 further comprising placing a harness about said bag and hoisting said harness member up with the bag supported therein prior to inserting said probe.

30. A method as recited in claim 28 wherein prior to inserting said probe said method includes forming a puncture in said bag with a conically tipped member which is a member that is in addition to a tapered front end of said probe and inserting said probe into the puncture.

31. A method as recited in claim 28 wherein said fine particles contain about 98% by volume of air.

32. A method as recited in claim 28 further comprising directing said fine particles drawn into said probe from said bag directly to a liquid such that the delivered fine particles continuously flow in a steady stream to a wetting location.

33. A method as recited in claim 28 wherein said bag being removed is a sealed unit in and of itself which holds said fine particles in air tight fashion.

34. A method of dust-free handling of a quantity of fine particles which includes fine dust particles comprising:

positioning at a predetermined location a reusable container within which is positioned a plastic bag containing about 100 pounds or more of said fine particles, said fine particles having an average particle size of less than 400μ and said fine dust being of a type that remains suspended in air if released from said bag, and said reusable container being sized to receive only a single one of said bag containing said about 100 pounds or more of said fine particles which particles are free from contact with said reusable container;

inserting a probe into said bag;

sealing said probe with respect to said bag, fluidizing the fine particles within the bag by injecting a gas through at least one injection opening in said probe;

discharging the fluidized fine particles by drawing the fine particles through at least one discharge opening formed in said probe while maintaining, during discharging, an environment around said bag with a fine particle concentration of less than 4 $mg/m^3$, and wherein prior to inserting said probe said method includes forming a puncture in said bag with a conically tipped member which is a member that is in addition to a tapered front end of said probe and inserting said probe into the puncture.

* * * * *